Figure 1:
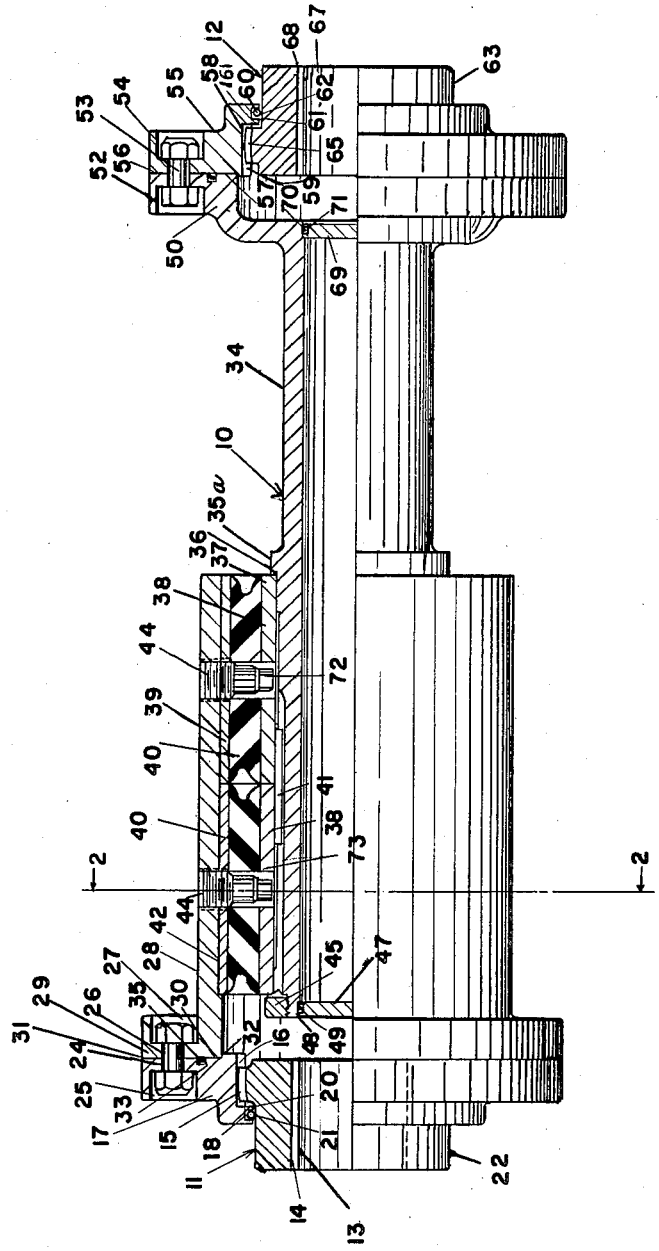

INVENTOR.
JOHN H. CRANKSHAW
BY
Charles L. Roverbeck
ATTORNEY

Aug. 25, 1959  J. H. CRANKSHAW  2,900,809
SOUND ISOLATING COUPLING
Filed Jan. 25, 1957  2 Sheets-Sheet 2

INVENTOR.
JOHN H. CRANKSHAW
BY
Charles L. Lourcheck
ATTORNEY

United States Patent Office 2,900,809
Patented Aug. 25, 1959

2,900,809
SOUND ISOLATING COUPLING

John H. Crankshaw, Erie, Pa., assignor to Zurn Industries, Inc., Erie, Pa., a corporation of Pennsylvania Application January 25, 1957, Serial No. 636,315

6 Claims. (Cl. 64—13)

This invention relates to couplings and, more particularly, to couplings for connecting prime movers to a load.

The sound from the engine of a mine sweeper or other craft is often transmitted from the engine through the propeller shaft to the propeller and then to the ambient water. The sounds thus transmitted are easily detected by enemy craft and the location of the vessel transmitting the sound will thus be revealed.

Accordingly, it is an object of this invention to provide a coupling for coupling a driving mechanism to a propeller which will prevent the sound of an engine from being transmitted through the propeller shaft.

Another object of this invention is to provide a sound isolating coupling for transmitting power to a load.

A further object of this invention is to provide a coupling for connecting a driving mechanism to a driven mechanism where the driving mechanism is connected to the driven mechanism through a flexible resilient member having a deflection limiting device thereon.

A still further object of this invention is to provide a coupling which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 2:
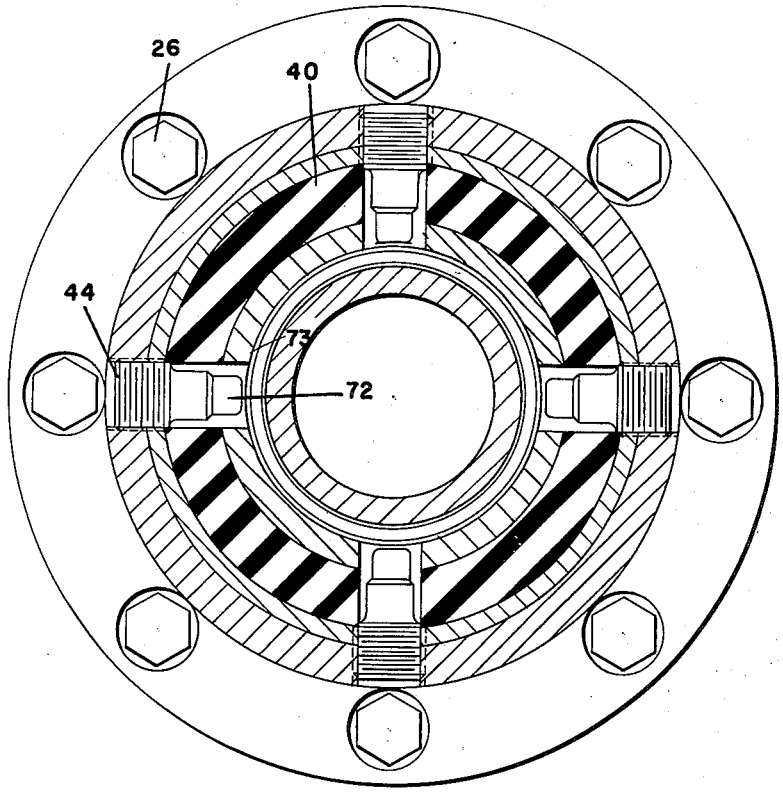

In the drawings:

Fig. 1 is a side view partially in cross section of a sound isolating coupling according to the invention; and Fig. 2 is a cross sectional view taken on line 2—2 of Fig. 1.

Now with more specific reference to the drawings, a coupling 10 is shown made up of a driving hub 11 and a driven hub 12. The driving hub 11 has a bore 13 with a keyway 14 for attaching the hub 11 to a driving shaft. The hub 11 has external crowned teeth 15 thereon which engage internal teeth 16 on a sleeve 17. The sleeve 17 has a rim 18 which overlies the teeth 15 and has an internal peripheral groove 20 therein which receives an O-shaped packing washer 21. The O-shaped packing washer 21 rests on an outer peripheral surface 22 of the driving hub 11, thereby preventing any leakage of lubricant therebetween.

The sleeve 17 has spaced holes 24 therein counterbored at 25 to receive bolts 26 which are similarly received in counterbored holes 27 in a flange 29. An outer member 28 has the flange 29 integrally attached thereto and the flange 29 receives the holes 27 therein. The sleeve 17 has a face 30 which abuts against a face 31 on the end of the flange 29. The outer edge of the sleeve 17 is relieved to form a shoulder 32 which extends inside the outer member 28. A groove 33 is formed in the face 30 and an O-ring 35 is received therein to form a seal between the end of the flange 29 and the sleeve 17.

A coupling spacer 34 has a rim 35a thereon terminating at one end in a shoulder 36 which abuts against an end 37 of one of the inner support tubes 38. Outer support tubes 39 are vulcanized to resilient members 40 and the inner support tubes 38 are vulcanized to the resilient member 40 on its outside surface while the inside is keyed to the coupling spacer 34 by means of a key 41 which rests in a keyway in the coupling spacer 34 and by means of a mating keyway in the inner support tubes 38. The members 28, 34, 38, and 40 are concentric with each other. There are two similar axially spaced resilient members 40. The outer support tubes 39 are supported in a counterbore 42 in the outer member 28 and held therein by threaded plugs 44 which are spaced around the periphery of the coupling which is better shown in Fig. 2.

The inner support tubes 38 are held against the shoulder 36 by a nut 45 which threadably engages the end of the coupling spacer 34 and urges the key 41 into the slot in the inner support tubes 38. One end of the coupling spacer 34 is sealed by a plug 47 which fits into a counterbore 48 in the end of the coupling spacer 34. A peripheral groove is formed therein and an O-shaped washer 49 in the groove forms a seal between the plug 47 and the spacer 34.

The driven end of the spacer 34 has a radially disposed flange 50 thereon which has spaced peripheral counterbored holes 52 receiving bolts 53 which extend through corresponding counterbored holes 54 in a sleeve 55. The face of the sleeve 55 has a machined surface 56 to form a fit against an end 57 of the flange 50.

The sleeve 55 has a bore 161 therein which has a counterbore 58 therein. The counterbore 58 has internal teeth 59. The bore 161 defines the inner surface of a flange 60 which has an internal groove 61 receiving an O-shaped washer 62 which rides on a surface 63 and forms a seal thereon. The hub 12 has external crowned teeth 65 which engage the internal teeth 59 and form a drive therewith and yet allow radial misalignment of the respective shafts attached to the hubs. A bore 67 may receive a suitable shaft keyed to the hub 12 by means of a key in the keyway 68. A plug 69 is fitted into the counterbore of a coupling sleeve 70 and a suitable O-shaped washer 71 forms a seal therein.

The plugs 44 have reduced sized ends 72 which extend into bores 73 in the inner support tubes 38 and limit the deflection of the resilient members 40 when a high torsional force is transmitted between the hubs 11 and 12 by virtue of the reduced sized portions 72 engaging the inner surface of the bores 73 when the resilient member 40 deflects. Therefore, when an exceedingly large torque is exerted by means of the driving hub 11, the reduced sized ends 72 of the plugs 44 will engage the sides of the bores 73 and a direct drive will result therebetween. Otherwise, during normal operation, the torque will be transmitted through the resilient member 40 and no continuous metal path will be formed and, therefore, the sound will not be transmitted between the driving hub 11 and the driven hub 12. The coupling disclosed herein is also advantageous because it will isolate electrical currents from the driving hub 11 to the driven hub 12.

The plugs 44 are adjustable radially to correct dynamic unbalance. The key 41 engages one end only of the tube 38. The torque is therefore transmitted from the outer member 28 to the tube 38 by the entire mass of rubber in the resilient member 40 and the stress in the rubber is therefore equalized.

The foregoing specification sets forth the invention in its preferred practical forms but the structure shown is capable of modification within a range of equivalents The embodiments of the invention in which an exclusive property or privilege is claimed are defined as follows:

1. A coupling comprising an inner support tube, a resilient sleeve, an outer support tube, said inner and outer support tubes and said resilient sleeve being disposed concentric with each other, said resilient sleeve being disposed between said inner and said outer support tubes and having its inner and outer surfaces fixed to the outer and inner surfaces, respectively, of said inner and outer support tubes, driving means attached to said outer support tube, driven means attached to said inner support tube, circumferentially spaced bores in said inner support tube, plugs attached to said outer support tube extending radially inwardly and extending into said bores in said inner tube, said bores being substantially larger than the part of said plugs extending thereinto, said plugs being clear of engagement with the periphery of said bores when a torque of a relatively low value is transmitted by said coupling, said plugs engaging one wall of said bore when a relatively high torque is transmitted, said driving means comprising an outer member concentric with said outer support tube, said plugs being attached to said outer member and said outer support tube by means of threads on the periphery of said plugs engaging threaded bores in said outer member and said outer tube whereby said outer tube and said outer member are locked together by said plugs.

2. The coupling recited in claim 1 wherein said plugs are adjustable in and out by means of said threads whereby dynamic balance of said coupling may be maintained.

3. The coupling recited in claim 1 wherein said driven means comprises a coupling spacer concentric with and disposed in said inner support tube and keyed to rotate therewith.

4. The coupling recited in claim 3 wherein said coupling spacer terminates at one end thereof in an internally toothed member and an externally toothed hub having its teeth engaging said internal teeth.

5. The coupling recited in claim 4 wherein said outer member terminates at one end thereof in an internally toothed member and an externally toothed driving hub having the teeth thereof in driving engagement with the teeth on said last mentioned internally toothed member.

6. The coupling recited in claim 5 wherein said internally toothed members each has an inwardly directed flange having a groove therein, said flanges each extending inwardly to proximate relation with said hubs, and an O-shaped washer is provided in each said groove sealingly engaging the external surfaces of said hubs outside of said teeth.

References Cited in the file of this patent

UNITED STATES PATENTS

| | | |
|---|---|---|
| 2,592,309 | Meier | Apr. 18, 1952 |
| 2,720,764 | Landrum | Oct. 18, 1955 |
| 2,727,368 | Morton | Dec. 20, 1955 |
| 2,790,312 | Hagenlocker et al. | Apr. 30, 1957 |

FOREIGN PATENTS

| | | |
|---|---|---|
| 580,901 | Great Britain | Sept. 24, 1946 |